United States Patent [19]

Nagasaki et al.

[11] 4,346,624
[45] Aug. 31, 1982

[54] PLANETARY SPEED CHANGE GEARING

[75] Inventors: Michisuke Nagasaki, Toyonaka; Shigehiro Sannomiya, Minoo, both of Japan

[73] Assignee: Yanmar Diesel Engine Co., Ltd., Osaka, Japan

[21] Appl. No.: 93,811

[22] Filed: Nov. 13, 1979

[30] Foreign Application Priority Data

Nov. 13, 1978 [JP] Japan .......................... 53-155831[U]
Nov. 13, 1978 [JP] Japan .......................... 53-155832[U]

[51] Int. Cl.$^3$ ........................ F16H 3/44; F16H 57/10; G05G 1/00; G05G 3/00
[52] U.S. Cl. .................................. 74/784; 74/467; 74/572; 74/606 A; 74/781 R
[58] Field of Search .................... 74/606 A, 572, 797, 74/801, 467, 781 R, 784; 46/206, 207

[56] References Cited

U.S. PATENT DOCUMENTS

| 1,865,648 | 7/1932 | Sifton et al. | 74/781 R |
| 2,015,108 | 9/1935 | Harper | 74/467 |
| 2,341,695 | 2/1944 | Critchfield | 74/572 |
| 2,391,186 | 12/1945 | Noble | 74/606 A |
| 2,409,506 | 10/1946 | McFarland | 74/781 R |
| 2,432,383 | 12/1947 | Colwell | 74/572 X |
| 2,481,914 | 9/1949 | Eastman | 74/606 A |
| 2,721,733 | 10/1955 | Driehaus | 74/572 X |
| 3,067,847 | 12/1962 | Beach | 74/572 X |
| 3,164,036 | 1/1965 | Lamburn et al. | 74/781 R |
| 3,515,246 | 6/1970 | Haight et al. | 74/467 X |
| 4,114,478 | 9/1978 | Clauss | 74/781 R |

FOREIGN PATENT DOCUMENTS

| 844541 | 7/1952 | Fed. Rep. of Germany | 74/781 R |
| 984878 | 7/1951 | France | 74/784 |
| 997939 | 1/1952 | France | 74/781 R |
| 443283 | 2/1936 | United Kingdom | 74/781 R |
| 493698 | 10/1938 | United Kingdom | 74/606 A |

Primary Examiner—Leslie Braun
Attorney, Agent, or Firm—Norbert P. Holler; Philip Rodman

[57] ABSTRACT

A planetary speed change gearing for a power transmission system including a flywheel secured to a power transmission shaft of an engine, a flywheel housing enclosing the flywheel and an output shaft provided on the flywheel side and directly connected to a machine to be driven. The planetary speed gearing is built in a recess formed in the flywheel.

11 Claims, 2 Drawing Figures

PLANETARY SPEED CHANGE GEARING

BACKGROUND OF THE INVENTION

This invention relates to a planetary speed change gearing built in a flywheel interposed between a power transmission shaft of an engine and an output shaft connecting the engine to a machine to be driven.

Heretofore, when a generator, a pump or other machine to be driven is directly connected to a rotary power transmission shaft of each of various types of prime movers, it has been necessary to mount a speed change gearing in a power transmission system if it is required to change the rate of rotation of the prime mover before rotation is transmitted to the driven machine.

However, mounting of a speed change gearing between the power transmission shaft of the engine and the output shaft for directly connecting the engine to the driven machine has the disadvantages that the power transmission system including the speed change gearing becomes large in size, heavy in weight and high in production cost.

SUMMARY OF THE INVENTION

This invention obviates the aforesaid disadvantages of the prior art. Accordingly, the invention has its object the provision of a planetary speed change gearing which is built in a flywheel secured to a power transmission shaft of an engine, so that the power transmission system including the planetary speed change gearing can have its size, weight and production cost reduced as a whole.

According to the invention, there is provided, in a power transmission system comprising a flywheel secured to a power transmission shaft of an engine, a flywheel housing enclosing the flywheel and an output shaft located on the flywheel side and directly connected to a machine to be driven, a planetary speed change gearing comprising elements mounted on the flywheel, flywheel housing and output shaft respectively and built in a recess formed in the flywheel.

The planetary speed change gearing also comprises a cover member mounted on the flywheel to close the recess so as to seal the planetary speed change gearing in the recess in the flywheel, the recess having a lubricant sealed therein, heat dissipating fins formed on the outer surface of the cover member, and ventilating apertures formed in the flywheel housing to permit air to flow therethrough into and out of the flywheel housing.

By the aforesaid structural features, the planetary speed change gearing is capable of transmitting power from the prime mover to the driven machine at a predetermined speed change rate or a speed reducing rate and a speed increasing rate without increasing the size of the power transmission system, and the planetary speed change gearing can be sufficiently lubricated and cooled to function smoothly.

DESCRIPTION OF THE PREFERRED EMBODIMENTS

Figure 1:
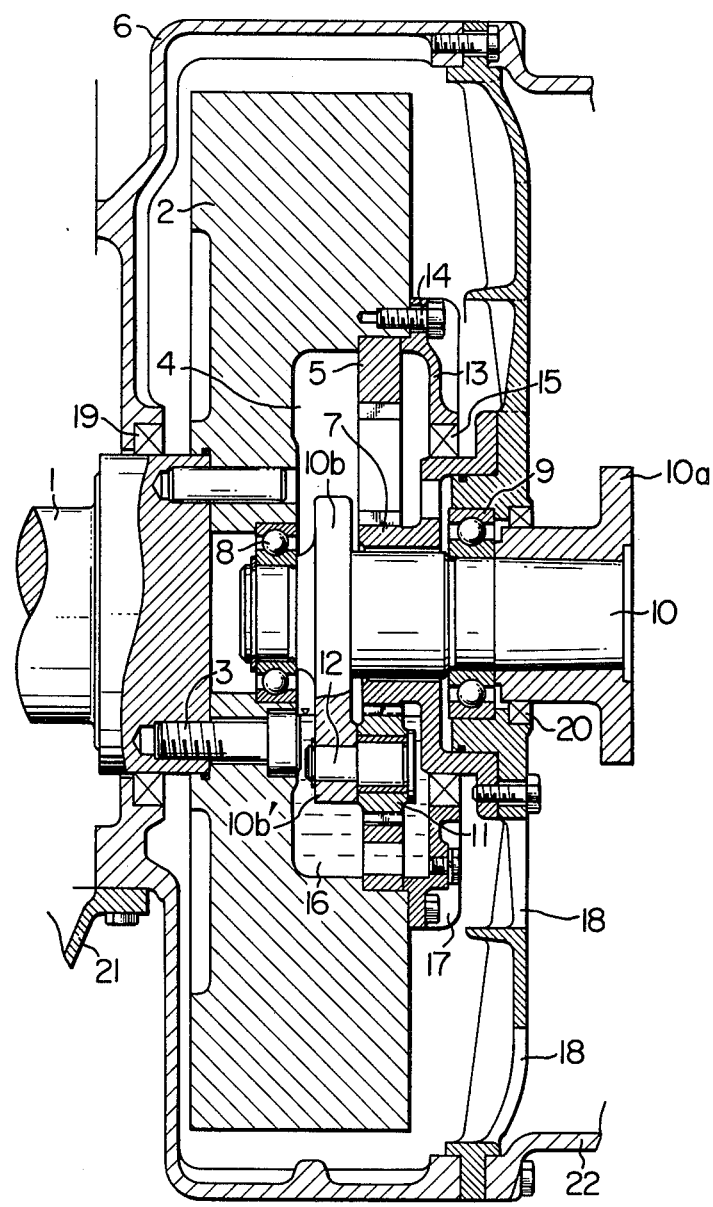
FIG. 1 is a sectional view of the planetary speed change gearing for transmitting power from a prime mover to a driven machine by reducing speed, which comprises one embodiment of the invention.

Referring to FIG. 1, a crank shaft 1 which is a power transmission shaft of the engine has a flywheel 2 secured thereto by a plurality of bolts 3. The flywheel 2 is formed with a concentric recess 4 having an annular internal gear 5 fitted therein near its open end.

The flywheel 2 is enclosed in a flywheel housing 6 having a sun gear 7 secured thereto in alignment with the internal gear 5 within the recess 4.

An output shaft 10 rotatably journalled by a bearing 8 mounted in the recess 4 of the flywheel 2. A bearing 9 mounted in the flywheel housing 6 extends outwardly of the recess 4 coaxially with the crank shaft 1 and has secured to its outer end for rotation with the output shaft 10 an output shaft coupling 10a directly connected to a driven machine, not shown.

Interposed between the internal gear 5 and the sun gear 7 are a plurality of planetary gears 11 in meshing engagement with the gears 5 and 7 and arranged equidistantly from one another on a circle. The planetary gears 11 are each supported by a shaft 12 which in turn is supported by one of projections 10b' of the planetary gear support member 10b equal in number to the planetary gears 11. The planetary gear support member 10b rotates with the output shaft 10.

A cover member 13 is secured to the flywheel 2 by a plurality of bolts 14 to seal the planetary speed change gearing including the internal gear 5, sun gear 7 and planetary gears 11 in the recess 4 of the flywheel 2. A sealing member 15 is fitted between the radial inner periphery of the cover member 13 and the sliding portion of the sun gear 7, and a lubricant 16 is sealed in the recess 4.

The cover member 13 is formed at its outer surface with a plurality of heat dissipating fins 17 arranged radially thereon. A plurality of ventilating apertures 18 are formed in a portion of the flywheel housing 6 which faces the heat dissipating fins 17.

In FIG. 1, the numerals 19 and 20 designate oil seals. The numeral 21 is a crankcase of the prime mover, while the numeral 22 is a case for the driven machine which is directly connected to the prime mover.

In the planetary speed change gearing constructed as aforesaid according to the invention, rotation of the crank shaft 1 rotates the internal gear 5 mounted on the flywheel 2, to thereby cause the planetary gears 11 to orbit along a path between the sun gear 7 and internal gear 5 while rotating on their own axes. The orbiting movement of the planetary gears 11 is transmitted to the output shaft 10 through the planetary gear support member 10b, to thereby rotate the output shaft 10 at a reduced rate of rotation.

The planetary speed change gearing built in the recess 4 of the flywheel 2 is lubricated by the lubricate 16 sealed in the recess 4. The heat dissipating fins 17 formed on the outer surface of the cover member 13 in contact with the lubricant 16 performs the function of a cooling fan by allowing air to flow through the ventilating apertures 18 into and out of the flywheel housing 6.

Figure 2:
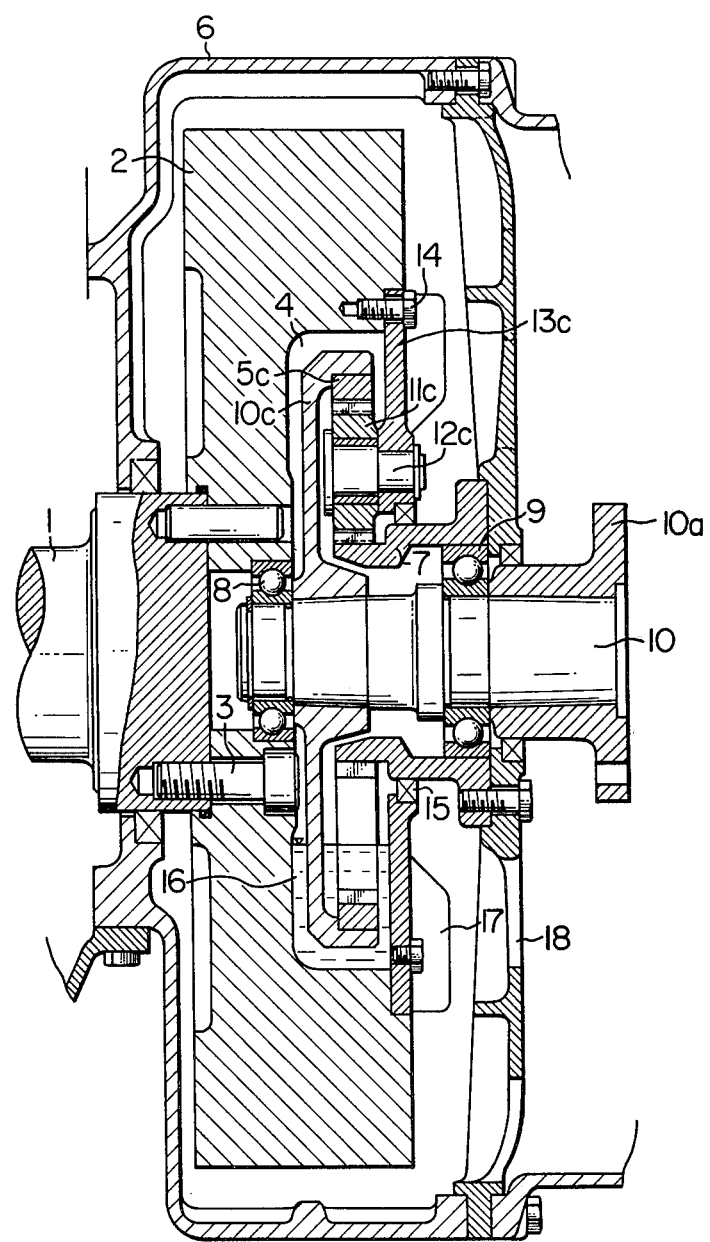
FIG. 2 is a sectional view of the planetary speed change gearing for transmitting power from a prime mover to a driven machine by increasing speed, which comprises another embodiment of the invention.

FIG. 2 shows another embodiment which is designed to increase the rate of rotation when power is transmitted to the output shaft from the crank shaft. The embodiment shown in FIG. 2 is similar to that shown in FIG. 1 in regard to the construction of crank shaft 1, flywheel 2, recess 4, bolts 3, flywheel housing 6, sun gear 7, bearings 8 and 9, output shaft 10 and output shaft coupling 10a. However, in the embodiment shown in FIG. 2, an annular internal gear 5C is fitted to an output shaft member 10c mounted on the output shaft 10 for rotation therewith. Interposed between the sun gear 7 and internal gear 5c are planetary gears 11C in meshing engagement with the gears 7 and 5C and arranged equidistantly from one another on a circle. The planetary gears 11C are each supported for rotation by a shaft 12C which in turn is supported by a cover member 13C secured to the flywheel 2 by the plurality of bolts 14. The sealing member 15 is fitted between the sliding portion of the sun gear 7 and the inner peripheral surface of the cover member 13C. Thus the cover member 13C performs the dual functions of sealing in the recess 4 of the flywheel 2 the planetary speed change gearing comprising the sun gear 7, internal gear 5C and planetary gears 11C and of serving as a support member for the planetary gears 11C, thereby permitting the number of parts to be reduced.

The lubricant 16 for the planetary speed change gearing is sealed in the recess 4, and the heat dissipating fins 17 formed on the cover member 13C cooperate with the ventilating apertures 18 formed in the flywheel housing 6 for cooling the planetary speed change gearing built in the recess 4, in the same manner as described by referring to the first embodiment shown in FIG. 1.

The second embodiment is constructed as described hereinabove. Rotation of the crank shaft 1 causes the shafts 12C supported by the cover member 13C of the flywheel 2 for supporting the planetary gears 11C to rotate the planetary gears 11C through engagement with the sun gear 7 secured to the flywheel housing 6, so that the planetary gears 11C on the shafts 12C orbit along a predetermined path while rotating on their own axes. Thus the internal gear 5C meshing with the planetary gears 11C transmits rotation to the output shaft 10 at a rate of rotation higher than that of the flywheel 2 or crank shaft 1. Stated differently, the planetary speed change gearing serves as a speed increasing gearing in the power transmission system.

From the foregoing description, it will be appreciated that as can be seen in the two embodiments, the present invention provides a planetary speed change gearing mounted in the recess formed in the flywheel, so that it is possible to obtain a compact overall size in a power transmission system and its weight is also reduced. The use of the planetary gears enables the construction to be simplified and production cost to be reduced.

Moreover, the present invention provides a cover member for sealing the planetary speed change gearing in the recess of the flywheel which also contains a lubricant sealed therein. The cover member has formed on its outer surface heat dissipating fins which cooperate with ventilating apertures formed in the flywheel housing for cooling the lubricant. Thus lubrication and cooling of the planetary speed change gearing can be effected satisfactorily.

What is claimed is:

1. A power transmission system comprising an input driver shaft and an output driven shaft, a flywheel affixed to said driver shaft for rotation with said driver shaft and including a recessed portion, a flywheel housing enclosing said flywheel and planetary speed change gear means for enabling the driven shaft to be rotated at a speed different from that of the driver shaft, said gear means comprising at least three gear types respectively supported by the flywheel, the flywheel housing and the driven shaft, said gear means being substantially disposed in the recessed portion of said flywheel so as to be substantially recessed in said flywheel, said transmission system further including a cover member concentric with said driven shaft and said sun gear, secured to said flywheel for rotation therewith and for covering the flywheel recess whereby said planetary speed change gear means are substantially enclosed in the flywheel recess.

2. A power transmission system as claimed in claim 1 including means for sealing the cover member to the flywheel and a lubricant provided in the enclosed flywheel recess.

3. A power transmission system as claimed in claim 2 wherein said cover member has an outer surface, and heat dissipating fins are formed on the outer surface of said cover member, said fly wheel housing being formed with ventilating apertures to ventilate air circulated by said fins from between the flywheel housing and said cover member during rotation of said flywheel.

4. A power transmission system as claimed in claim 1 wherein one of the gear types comprise an annular internal gear secured to said flywheel at said recessed portion, a second of the gear types comprising a sun gear secured to said flywheel housing, and a third of the gear types comprising a plurality of planetary gears supported on said driven shaft for simultaneous meshing engagement with said sun gear and said annular internal gear.

5. A power transmission system as claimed in claim 4 including means for sealing the cover member to the flywheel and a lubricant provided in the enclosed flywheel recess.

6. A power transmission system as claimed in claim 5 wherein said cover member has an outer surface, and heat dissipating fins are formed on the outer surface of said cover member, said flywheel housing being formed with ventilating apertures to ventilate air circulated by said fins from between the flywheel housing and said cover member during rotation of said flywheel.

7. A power transmission system as claimed in claim 1 wherein one of the gear types comprise an annular internal gear secured to said output shaft, a second of the gear types comprising a sun gear secured to said flywheel housing, and a third of said gear types comprising a plurality of planetary gears supported by said flywheel for simultaneous meshing engagement with said sun gear and said annular internal gear.

8. A power transmission system as claimed in claim 7 further including a cover member secured to said flywheel for rotation therewith and concentric with said driven shaft and said sun gear for covering the flywheel recess whereby said planetary speed change gear means are substantially enclosed in the flywheel recess and wherein said plurality of planetary gears are mounted to said cover member for support by said flywheel, said system further including means for sealing the cover member to the flywheel and a lubricant provided in the enclosed flywheel recess.

9. A power transmission system as claimed in claim 8 wherein said cover member has an outer surface and heat dissipating fins are formed on the outer surface of said cover member, said flywheel housing being formed with ventilating apertures to ventilate air circulated by said fins from between the flywheel housing and said cover member.

10. A power transmission system as claimed in claim 7 including means for sealing the cover member to the flywheel and a lubricant provided in the enclosed flywheel recess.

11. A power transmission system as claimed in claim 10 wherein said cover member has an outer surface, and heat dissipating fins are formed on the outer surface of said cover member, said fly wheel housing being formed with ventilating apertures to ventilate air circulated by said fins from between the flywheel housing and said cover member during rotation of said flywheel.

* * * * *